US012275087B2

(12) United States Patent
Hesse et al.

(10) Patent No.: US 12,275,087 B2
(45) Date of Patent: Apr. 15, 2025

(54) METHOD FOR WELDING SHEETS WITH COATINGS COMPRISING AN ALLOY OF ALUMINUM AND SILICON

(71) Applicant: TRUMPF Laser- und Systemtechnik GmbH, Ditzingen (DE)

(72) Inventors: Tim Hesse, Ditzingen (DE); Nicolai Speker, Pleidelsheim (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 0 days.

(21) Appl. No.: 18/741,573

(22) Filed: Jun. 12, 2024

(65) Prior Publication Data
US 2024/0367265 A1 Nov. 7, 2024

Related U.S. Application Data

(63) Continuation of application No. PCT/EP2022/084804, filed on Dec. 7, 2022.

(30) Foreign Application Priority Data

Dec. 17, 2021 (DE) ...................... 10 2021 133 684.8
Aug. 19, 2022 (DE) ...................... 10 2022 121 052.9

(51) Int. Cl.
B23K 26/32 (2014.01)
B23K 26/06 (2014.01)
(Continued)

(52) U.S. Cl.
CPC .......... B23K 26/322 (2013.01); B23K 26/062 (2015.10); B23K 26/073 (2013.01);
(Continued)

(58) Field of Classification Search
None
See application file for complete search history.

(56) References Cited

U.S. PATENT DOCUMENTS 4,873,415 A 10/1989 Johnson et al.
10,118,249 B2 11/2018 Solomon et al.
(Continued)

FOREIGN PATENT DOCUMENTS

CN 209190026 U * 8/2019
CN 110369868 A * 10/2019 ............. B23K 26/21
(Continued)

OTHER PUBLICATIONS

Machine translation of CN 112719598 A, Nov. 2024 (Year: 2024).*
(Continued)

Primary Examiner — Geoffrey S Evans
(74) Attorney, Agent, or Firm — LEYDIG, VOIT & MAYER, LTD.

(57) ABSTRACT

A method of welding two metal sheets includes providing a first sheet having a first weld surface and a second sheet having a second weld surface. The first sheet has a coating includes an alloy of aluminum and silicon on the first weld surface. The method further includes irradiating the first weld surface and the second weld surface with a laser beam. The laser beam has an inner core and an outer ring with different intensity profiles. The laser beam is moved with a wobbling motion in a feed direction along an imaginary feed line and perpendicular to the imaginary feed line. A path of the laser beam along the imaginary feed line is of a periodic shape. A width of the path perpendicular to the imaginary feed line is greater than a length of a period of the path along the imaginary feed line.

20 Claims, 4 Drawing Sheets

(51) Int. Cl.
  *B23K 26/062* (2014.01)
  *B23K 26/073* (2006.01)
  *B23K 26/08* (2014.01)
  *B23K 26/244* (2014.01)
  *B23K 26/322* (2014.01)
  *B23K 101/18* (2006.01)
  *B23K 101/34* (2006.01)

(52) U.S. Cl.
  CPC ........ *B23K 26/0876* (2013.01); *B23K 26/244* (2015.10); *B23K 2101/18* (2018.08); *B23K 2101/34* (2018.08)

(56) References Cited

U.S. PATENT DOCUMENTS

| | | | | |
|---|---|---|---|---|
| 2014/0124488 | A1* | 5/2014 | Lee | B23K 26/244 219/121.64 |
| 2019/0381601 | A1* | 12/2019 | Matsuo | B23K 26/0608 |
| 2020/0047285 | A1 | 2/2020 | Yang et al. | |
| 2020/0072266 | A1* | 3/2020 | Miyashiro | F16B 5/08 |
| 2020/0171603 | A1 | 6/2020 | Yang et al. | |
| 2020/0180077 | A1 | 6/2020 | Riquelme et al. | |
| 2020/0254562 | A1 | 8/2020 | Brescoe et al. | |
| 2021/0162539 | A1* | 6/2021 | Kayahara | B23K 26/0608 |
| 2022/0324054 | A1* | 10/2022 | Walde | B23K 26/28 |

FOREIGN PATENT DOCUMENTS

| | | | | |
|---|---|---|---|---|
| CN | 112469526 | A * | 3/2021 | ........... B23K 26/032 |
| CN | 112719598 | A * | 4/2021 | ............. B23K 26/14 |
| CN | 115026429 | A * | 9/2022 | |
| DE | 102010060983 | A1 * | 6/2011 | ......... B23K 26/0869 |
| DE | 102014107716 | B3 | 6/2015 | |
| DE | 102019218398 | A1 | 5/2021 | |
| EP | 0327320 | A1 | 8/1989 | |
| JP | H1071480 | A | 3/1998 | |
| WO | WO-2021230070 | A1 * | 11/2021 | ........... B23K 26/082 |
| WO | WO-2022075208 | A1 * | 4/2022 | ........... B23K 26/082 |
| WO | WO-2022075209 | A1 * | 4/2022 | ........... B23K 26/082 |
| WO | WO-2022117207 | A1 * | 6/2022 | |

OTHER PUBLICATIONS

Machine translation of CN-115026429-A, Nov. 2024 (Year: 2024).*
Machine translation of CN-20190026-U, Dec. 2024 (Year: 2024).*
Machine translation of WO-2021230070-A1, Dec. 2024 (Year: 2024).*
Machine translation of CN-110369868-A, Dec. 2024 (Year: 2024).*
Machine translation of WO-2022075208-A1, Dec. 2024 (Year: 2024).*
Machine translation of CN-112469526-A, Dec. 2024 (Year: 2024).*
Machine translation of DE-102010060983-A1, Dec. 2024 (Year: 2024).*
Machine translation of WO-2022075209-A1, Dec. 2024 (Year: 2024).*
Machine translation of WO-2022117207-A1, Dec. 2024 (Year: 2024).*
Chen, Nannan, et al, "Effect of AlSi coating on laser spot welding of press hardened steel and process improvement with annular stirring," Materials & design Oct. 2020, pp. 1-16, vol. 195, 108986, Elsevier, Amsterdam, Netherlands.

* cited by examiner

Providing a first sheet having a first weld surface and a second sheet having a second weld surface, the first sheet having a coating comprising an alloy of aluminum and silicon on the first weld surface

410

Irradiating the first weld surface and the second weld surface with a laser beam, the laser beam having an inner core and an outer ring with different intensity profiles, wherein the laser beam is moved with a wobbling motion in a feed direction along an imaginary feed line and perpendicular to the imaginary feed line, wherein a path of the laser beam along the imaginary feed line is of a periodic shape, a width of the path perpendicular to the imaginary feed line being greater than a length of a period of the path along the imaginary feed line and optionally wherein the first sheet and the second sheet are joined by a fillet weld or by an I-weld, and optionally wherein the path of the laser beam is in a form of a sinusoidal function, a meander, or a zigzag function and optionally wherein the path of the laser beam is in a form of successive eights or infinity symbols and optionally wherein the imaginary feed line has a sinusoidal, circular, spiral, or zig-zag shape, or a C-shape

METHOD FOR WELDING SHEETS WITH COATINGS COMPRISING AN ALLOY OF ALUMINUM AND SILICON

CROSS REFERENCE TO RELATED APPLICATIONS

This application is a continuation of International Application No. PCT/EP2022/084804 (WO 2023/110584 A1), filed on Dec. 7, 2022, and claims benefit to German Patent Application No. DE 10 2022 121 052.9, filed on Aug. 19, 2022 and German Patent Application No. DE 10 2021 133 684.8, filed on Dec. 17, 2021. The aforementioned applications are hereby incorporated by reference herein.

FIELD

Embodiments of the present invention relate to a method for welding metal sheets.

BACKGROUND

EP 0 327 320 A1 relates to a process for welding two sheets of metal together, in which an outgassing path for gases generated during welding is formed in the welded joint.

U.S. Pat. No. 10,118,249 B2 discloses a method of welding two metal sheets, wherein a laser beam is guided along a helical path on the sheets to effect a heat distribution suitable for a smooth weld.

US 2020/0047285 A1 relates to a process for welding two overlapping sheets in which, to enhance an outgassing process in the sheets, particularly of zinc, a preliminary molten pool is generated by a laser beam with relatively low power density. Subsequently, a laser beam with higher power density is used to generate a principal molten pool with greater expansion.

US 2020/0171603A1 describes a method for welding two sheets in a stack of sheets, in which a laser beam is guided along a first path in a first direction and then along a second path in a second direction opposite to the first direction, wherein the first path and the second path overlap. The repeated irradiation of the weld path reduces defects created during welding.

US 2020/0254562A1 discloses a method for welding sheet metal using a center laser beam and an annular concentric laser beam, with the annular concentric laser beam surrounding the center laser beam in a radial direction. The annular concentric laser beam and the center laser beam have different power densities, which are varied to effect smoothing of the weld area.

SUMMARY

Embodiments of the present invention provide a method of welding two metal sheets. The method includes providing a first sheet having a first weld surface and a second sheet having a second weld surface. The first sheet has a coating includes an alloy of aluminum and silicon on the first weld surface. The method further includes irradiating the first weld surface and the second weld surface with a laser beam. The laser beam has an inner core and an outer ring with different intensity profiles. The laser beam is moved with a wobbling motion in a feed direction along an imaginary feed line and perpendicular to the imaginary feed line. A path of the laser beam along the imaginary feed line is of a periodic shape. A width of the path perpendicular to the imaginary feed line is greater than a length of a period of the path along the imaginary feed line.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 shows a flowchart illustrating a method of welding two metal sheets according to some embodiments.

DETAILED DESCRIPTION

Figure 1:
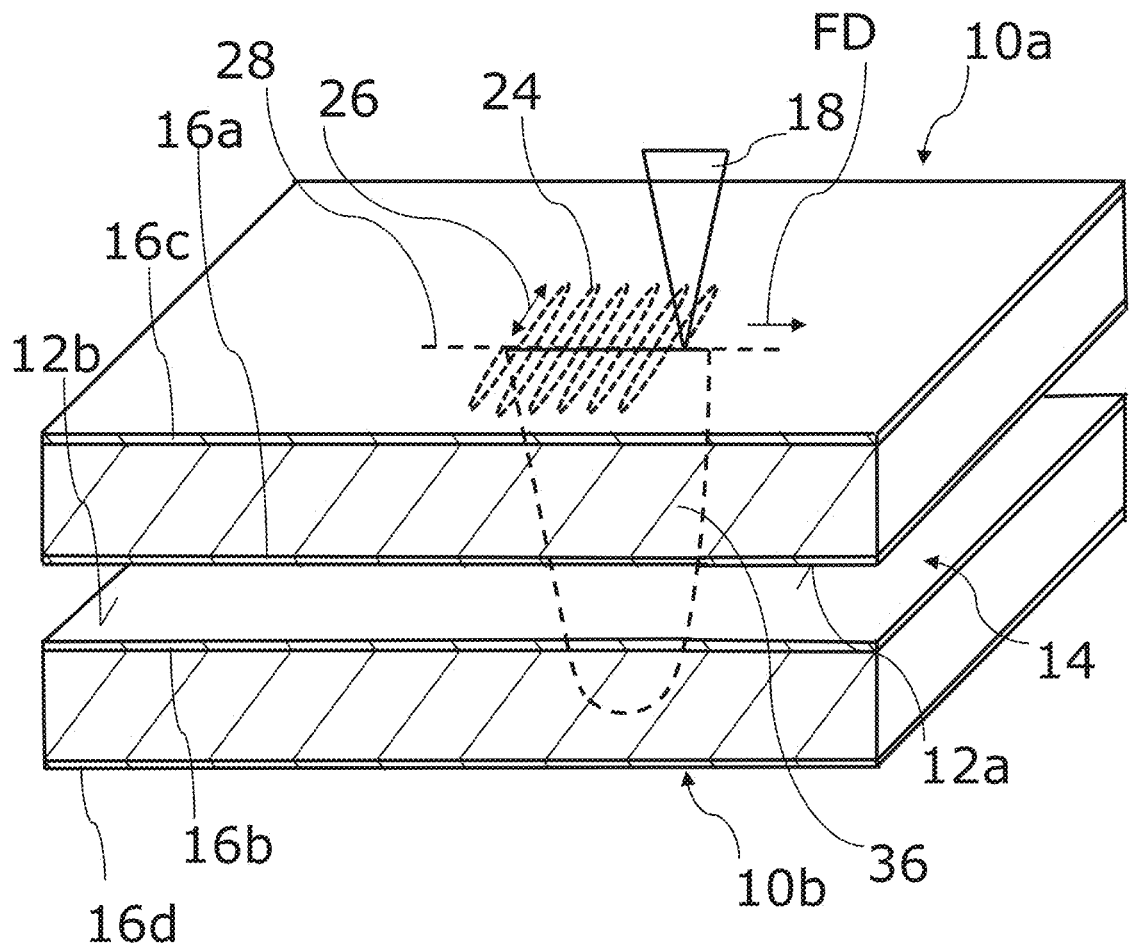
FIG. 1 schematically shows a process of welding two metal sheets according to some embodiments.

Embodiments of the present invention provide a method for further reducing defects when two sheets are welded by a laser beam, especially defects caused by a coating on the sheets, wherein the coating comprises an alloy of aluminum and silicon.

According to embodiments of the invention, the method comprises the following steps:
a) providing a first sheet having a first weld surface and a second sheet having a second weld surface, the first sheet having a coating comprising an alloy of aluminum and silicon on the first weld surface;
b) irradiating the first weld surface and the second weld surface with a laser beam, the laser beam having an inner core and an outer ring whose intensity profiles differ,
wherein the laser beam is moved with a wobbling motion in a feed direction along an imaginary feed line and perpendicular to the feed line,
wherein the path of the laser beam along the feed line is of periodic shape, the width of the path perpendicular to the feed line being greater than the length of the period of the path along the feed line.

Embodiments of the invention are of particular advantage for car body sheet metal, which includes a certain degree of cold formed standard or GEN3 steels. The surface has a corrosion protection coating comprising an alloy of aluminum and silicon. Before laser welding this coating needs to be removed in the weld area to prevent weld cracks.

Typically, a certain crack risk arises when comparatively high amounts of the aluminum and/or silicon (from the coating) locally fuse with the molten steel. This results in intermetallic phases. These phases cause embrittlement of the basic material leading to seam cracks. Those crack events can occur immediately or with a delay in time.

Embodiments of the invention relate to the welding of at least partially coated sheets that contain metal, preferably steel. In particular, embodiments of the invention relate to the welding of sheets with a coating on one or both sides of the sheet metal, wherein the coating comprises an alloy of aluminum and silicon.

The fact that the width of the path of the laser beam that is used for the welding perpendicular to the feed line is greater than the length of the period of the path along the feed line enables a uniform heat distribution on the welding surfaces. Thereby, a uniform diffusion of the aluminum and silicon from the coating into the material of the sheet is promoted, preventing or at least reducing defects in the welded joint of the sheets.

Beam shaping, wherein a laser beam has an inner core and an outer ring of different intensity profiles reduces the risk of spattering when welding, thereby also improving the quality of the welded joint of the sheets. The intensity profiles of the inner core and the outer ring of the laser beam can be changed during the welding process to adapt the heat distribution generated by the laser beam to local changes in the sheet metal on the path of the laser beam which in particular defines the welding path in the welding process.

Advantageously, the welding strategy by wobbling can be designed in such a way that the welding process has a certain gap bridging ability. This is possible due to the widening of the melting zone by oscillation of the laser beam in harmonic patterns in a transverse and longitudinal direction out of a center point of the laser beam axis, in particular a nominal laser beam axis.

The welding strategy by wobbling is designed in such a way that the resultant welding speed allows the elements of the anti-corrosion layer to heat up until the evaporation of those elements, while the steel volume beneath the hot coating section is still solid. This enables the diffusion of melted elements from the coating into the material of the plate.

Some embodiments of the invention relate to the welding of at least two sheet metals in an overlap situation, where the weld can be arranged as a partial penetration weld or a root fusion weld, a so-called full penetration weld.

In some embodiments of the invention, a welding technology with beam shaping can be used, wherein the laser beam does not correspond to typically used Gaussian or top-head intensity profiles.

Some embodiments of the invention use a 2in1 fiber technology, wherein the optical fiber is a beam guidance fiber or an optical fiber as part of a fiber laser source. Fiber diameters are core/ring=50 μm/200 μm or 100 μm/400 μm or 200 μm/700 μm. The fiber may also comprise more than two sections, especially the inner core (section) and at least two ring (sections), which are arranged in a concentric manner around the inner core.

In particular, for the beam parameter product BPP of the laser beam in the core fiber there holds: BPP>1 mm*mrad and BPP<12 mm*mrad, preferably BPP>1.8 mm*mrad and BPP<8 mm*mrad, especially BPP≥2 mm*mrad and BPP≤4 mm*mrad.

Preferably, the laser power is in the range of 1 kW up to 24 kW and in particular in the range of 4 kW up to 8 kW, especially 6 kW to 8 kW.

In some embodiments of the invention, beam shaping can be done with a DOE (diffractive optical element). A scanner optic can be used to move the laser beam along a path to be welded.

In particular, the work piece can be positioned in a controlled way to get a spacing between the first and second sheet. The spacing can be done by a clamping device, which can be opened in a controlled way, by 0.1 mm up to 0.3 mm, after the clamping has pressed the parts together to full contact. The spacing can be done by attaching elevations ("laser dimples"), which can be generated by impinging laser pulses in the area where the welding takes place. Another way to do the spacing is the use of shims.

Wobbling is used, wherein the preferred pattern is an eight (8) shaped pattern.

In particular, the main axis of the pattern, preferably in the feed direction of the laser beam, is transversely orientated to the welding direction.

Preferably, the eight (8) shaped pattern is of dimension of 0.5 mm up to 3 mm, as a total, in the direction of the main axis, preferably in a direction perpendicular to the feed direction of the laser beam during welding. This elongation can be in the range of 0.8 mm up to 2 mm, in particular in the range of 1 mm up to 1.5 mm.

The frequency of the oscillation to generate the wobbling pattern can be in the range of 100 Hz up to 1000 Hz. Preferably, the frequency of the oscillation is higher than 300 Hz, in particular higher than 333 Hz.

The wobbling curve of the laser beam can be circular, wherein due to the transverse movement of the process zone of the welding process along the path to be welded the resulting pattern is a spiral. The spiral pattern can be of dimension of 0.5 mm up to 3 mm, as a total, in the direction of the main axis, preferably in a direction perpendicular to the feed direction of the laser beam during welding. Preferably, this extension or elongation is in the range of 0.8 mm up to 2 mm, or advantageously in the range of 1 mm up to 1.5 mm.

The wobbling figure can be oval, wherein due to the transverse movement of the process zone along the path to be welded the resulting pattern is a spiral. The main axis of the oval figure is preferably transversely orientated to the welding direction. The oval figure can be of dimension of 0.5 mm up to 3 mm, as a total, in the direction of the main axis. Preferably, this elongation is in the range of 0.8 mm up to 2 mm, preferably in the range of 1 mm up to 1.5 mm. Here, the length of the short axis of the oval figure is preferably in the range of 5% up to 80% of the length of the main axis of the oval figure, preferably 10% of the length of the main axis, especially in a direction perpendicular to a feed direction of the laser beam during welding.

In particular, the wobbling speed for forming the wobbling pattern is 800 mm/s up to 2000 mm/s, preferably 1500 mm/s.

The typical welding speed amounts to 2 m/min up to 8 m/min and preferably 4 m/min.

In particular, the starting laser power ramp lasts 225 ms, wherein a distance of 15 mm is passed. Preferably, the laser power rises from 0 W to 6000 W. The welding and wobbling speed can be kept constant.

Preferably, the final laser power ramp lasts 150 ms, wherein a distance of 10 mm is passed. The laser power can drop from 6000 W to 1200 W. In particular, the welding and wobbling speed can be kept constant.

Preferably, the scanner optic for welding can work with an optical magnitude which is in the range of 1:1 up to 4:1, preferably in the range of 1.5:1 up to 3.26:1, especially preferably 1.7:1.

In particular, a 2in1 fiber is used with a core/ring diameter ratio of 50 μm/200 μm or 100 μm/400 μm of 200 μm/700 μm, wherein the diameters may vary by +/−50 μm.

Preferably, IR solid state lasers with wavelength $\eta$ in the range of 800 nm<$\eta$<2000 nm are used, preferably in the range of 1000 nm<$\eta$<1100 nm, especially preferably 1030 nm, 1063 nm and 1070 nm.

In particular, a laser beam with power in the range of 1 kW up to 24 kW, preferably in the range of 4 kW up to 8 kW, is used.

In particular, a beam shaping device to generate a centrally orientated and/or positioned beam of high brilliance and an annularly orientated and/or positioned ring beam of less brilliance than the center beam is used.

The center laser beam and the annular laser beam may have different wavelengths. The center laser beam and the annular laser beam may originate from the same laser source. Alternatively, they can also originate from separate laser sources.

The second weld surface is coated with an alloy of aluminum and silicon according to an advantageous embodiment of the invention. In particular, this protects the second sheet at the second weld surface from corrosion.

The wobbling motion has the same amplitude on both sides of the feed line according to a further embodiment of the invention, wherein the amplitude is in particular greater than the period of the path of the laser beam along the imaginary feed line. The heat generated by the laser beam is distributed over a comparatively large area. This helps to ensure that the alloy of aluminum and silicon diffuses uniformly into the material of the sheet.

The first sheet and the second sheet are arranged as a lap joint according to some embodiments of the invention. In particular, the first weld surface and the second weld surface are located on the longer side surfaces of the first sheet and the second sheet. The degassing gap is located between the longer side surfaces of the first sheet and the second sheet.

The first sheet and the second sheet are arranged as a lap joint in some embodiments of the invention.

In further embodiments of the invention, the plates are joined by a fillet weld or by an I-weld.

Preferably, the path of the laser beam is in the shape of a sinusoidal function, a zigzag function, a meander, of successive eights or infinity symbols. A weld path having one of the aforementioned shapes promotes uniform distribution of the heat generated by the laser beam in the weld surfaces during welding.

Advantageously, the power of the laser beam is varied along the path of the laser beam. Modulating the laser beam power along the path of the laser beam enables the energy load of the weld zone generated by the laser beam to be varied in order to control the heat input in the feed direction of the laser beam, wherein the anti-corrosion layer will be removed by the laser beam without melting or softening the base material, in particular the steel sheet metal.

In a specialized version of the aforementioned embodiment of the invention, the power of the laser beam is increased or decreased during the welding process in a predetermined section at the end of the laser beam in the feed direction of the laser beam compared to the averaged power of the laser beam on the path of the laser beam. In particular, the local laser power can be adjusted to be higher or lower than the average laser power on the welding path when the laser approaches still unmelted sections of the sheets in the feed direction. This promotes a uniform diffusion of the alloy of aluminum and silicon into the material of the sheet at the end of the weld paths. The laser beam can be in a continuous wave (cw), pulse or modulated operation mode.

In some embodiments of the invention, the laser power can be constant along the path of the laser beam.

In another preferred embodiment of the invention, the laser beam is guided several times along the same segment of the feed line, the amplitude of the wobbling movement in the direction perpendicular to the imaginary feed line being set differently for each pass of the segment. The heat input from the laser beam into the sheets is gradually increased along the segment, especially close to the weld path. In this way, the diffusion of the alloy of aluminum and silicon can be controlled better. Remaining local brittle intermetallic phases are re-melted and the embrittling elements are better distributed in the molten iron-based material of the sheets.

The first sheet and/or the second sheet comprises a steel that contains ferrite, martensite, bainite and/or austenite in some embodiments of the invention, wherein the steel is in particular a multiphase steel. Preferably, the first sheet and/or the second sheet contain a Gen 3 steel. Gen 3 steel is typically a multiphase steel, which at least partly consists of the aforementioned components. In particular, the Gen 3 steel comprises retained austenite in a bainite and/or martensite matrix. Gen 3 steels are advanced high strength steels with a high tensile strength and a good ductility.

Advantageously, the method according to embodiments of the invention facilitates the welding of coated steels and Gen 3 steels without removing the anti-corrosion layer. Also, the method according to the invention facilitates the welding of coated steels and Gen 3 steels while avoiding an embrittlement of the weld zone due to interfused coating elements in an improper high amount.

(Alloys out of Gen 3 steel grades are for example known from the manufacturers Arcelor Mittal and USS Steel. They comprise Fortiform®980, Fortiform®1050, Fortiform®1180, 980 XG3, HDGI 980, XG3 AHSS.)

Preferably, the imaginary feed line is sinusoidal, circular, spiral, of a zig-zag shape or of a C-shape. In particular, a path of the laser beam along a spiral imaginary feed line promotes a comparatively uniform heat distribution, thereby improving a uniform diffusion process.

According to a further embodiment of the method, the first weld surface and the second weld surface are arranged such that the first weld surface and the second weld surface face each other, with a gap between the first weld surface and the second weld surface. A gap promotes the removal of possible additional elements in the coating which turn into gas during the welding process.

In an advantageous embodiment of the invention, the width of the gap between the first weld surface and the second weld surface is 0.05 mm to 0.5 mm, in particular 0.1 mm to 0.2 mm. A gap width in this range is suitable for a uniform degassing and welding process caused by a wobbling motion of the laser beam according to embodiments of the invention.

The wobbling strategy enables welding of sheet metal with a spacing of the aforementioned width. In principle, wobbling is also suitable for welding in zero gap arrangements. The gap can be of a circular shape. The escape of vapor in a radial direction in such a gap is advantageous because otherwise the vapor can escape right through a keyhole generated during melting the sheet material, pushing the molten steel out of the process zone and rendering the weld potentially unusable.

In preferred embodiments of the invention, the proportion of the power of the inner core of the laser beam is 20% to 80% of the total power of the inner core and the outer ring of the laser beam, in particular 59% to 61% of the total power. A power distribution in this range leads to a heat zone in the sheets which promotes the diffusion process of the alloy of aluminum and silicon into the material of the sheet. In some embodiments, the laser beam may comprise more than one outer ring section, each ring section being concentric with regard to each other and with regard to the inner core of the laser beam. In this embodiment, the proportion of the power of the inner core of the laser beam may be 20% to 80% of the total power of the laser beam (i.e. comprising the inner core and all outer rings), in particular 59% to 61% of the total power.

According to a further embodiment of the invention, the speed of the laser beam along the feed line during the wobbling motion is 2 m/min to 8 m/min, in particular 3 m/min to 5 m/min. Here, the speed of the laser beam along the feed line is limited to keep the amount of melted fluid per time unit at low values, where the melted fluid is generated by melting the alloy of aluminum and silicon in the coating. In this way, a uniform diffusion of the aluminium and/or silicon into the material of the sheet is achieved.

Further advantages of the invention can be seen from the description and the drawing. Likewise, the above-mentioned and the still further elaborated features can each be used individually or in any combination. The embodiments shown and described are not to be understood as a conclusive list, but rather have an exemplary character for the description of the invention.

FIG. 1 schematically shows a process of welding a first sheet 10a with a first weld surface 12a and a second sheet 10b with a second weld surface 12b, where the sheets 10a, 10b are shown in a cross-section. The sheets 10a, 10b are of a cuboid shape and are arranged as a lap joint. The first weld surface 12a and the second weld surface 12b are positioned on two of the bigger side surfaces of the plates 10a, 10b, facing each other. A gap 14 spatially separates the first weld surface 12a and the second weld surface 12b. The first weld surface 12a and the second weld surface 12b are covered by coatings 16a, 16b, comprising an alloy of aluminum and silicon, wherein further coatings 16c, 16d comprising an alloy of aluminum and silicon are placed on side surfaces of the sheets opposite to the first weld surface 12a and the second weld surface 12b. The coatings 16a-16d comprising an alloy of aluminum and silicon serve to protect the sheets 10a, 10b from corrosion.

The first weld surface 12a and the second weld surface 12b are irradiated with a laser beam 18 to generate a melting zone 36 in order to weld the sheets 10a, 10b. The laser beam 18 is moved along a wobbling curve in a feed direction FD, where the wobbling curve defines a path 24 of the laser beam 18. Perpendicular to the feed direction FD, the path 24 of the laser beam 18 has the same amplitude 26 on both sides of an imaginary feed line 28 which runs in the feed direction FD. The path 24 of the laser beam 18 is of a periodic meandering shape. The amplitude 26 of the path 24 of the laser beam 18 is greater than the length of the period 30 (see FIG. 3) of the path 24 of the laser beam 18 along the imaginary feed line 28.

Figure 2:
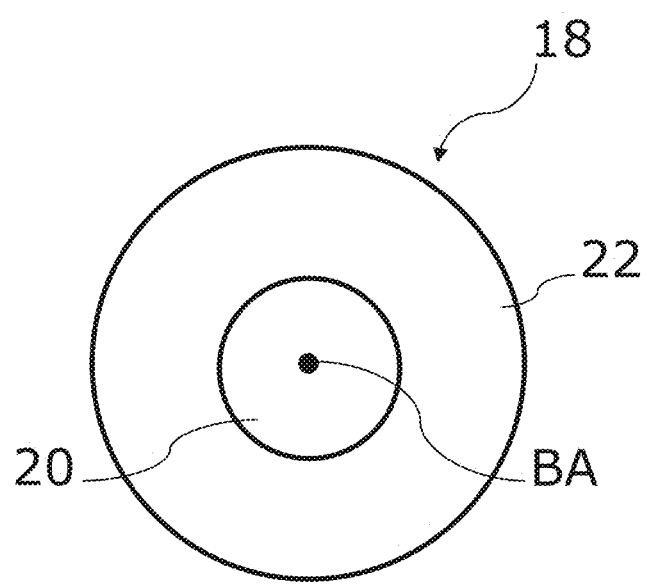
FIG. 2 schematically shows a cross-section through a laser beam used in the welding process according to some embodiments.

FIG. 2 schematically shows a cross-section through the laser beam 18 with an inner core 20 and an outer ring 22 of different intensities in a radial direction from a beam axis BA (here in and out of the paper plane) of the laser beam 18. The inner core 20 and the outer ring 22 help to avoid spattering during the welding process. The ratio of the intensities of the inner core 20 and the outer ring 22 of the laser beam 18 can be changed along the path 24 (see FIG. 1) of the laser beam 18 to adapt the welding process to the local characteristics of the sheets 10a, 10b.

Figure 3:
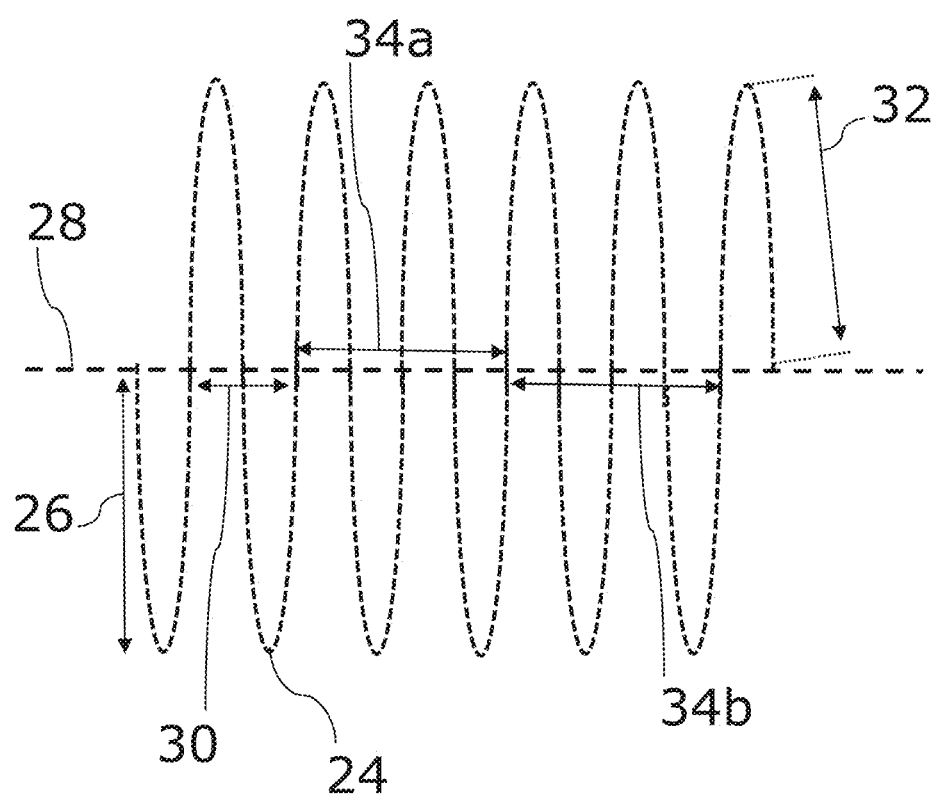
FIG. 3 schematically shows an enlarged view of the path of the laser beam according to some embodiments.

FIG. 3 schematically shows an enlarged view of the path 24 of the laser beam 18 (cf. FIG. 1). In a predetermined section 32 at an end of the path 24 of the laser beam 18 in the feed direction FD of the laser beam 18, the power of the laser beam 18 is increased or decreased during the welding operation compared to the averaged power of the laser beam 18 on the path 24 of the laser beam 18. The imaginary feed line 28 is divided into several segments 34a, 34b. The laser beam 18 can be guided several times along the same segments 34a, 34b of the feed line 28, the amplitude 26 of the path 24 of the laser beam 18 in the direction perpendicular to the imaginary feed line 28 being set differently for each pass of the segments 34a, 34b.

Embodiments of the invention relate to a method of welding a first weld surface 12a of a first sheet 10a to a second weld surface 12b of a second sheet 10b, the first weld surface 12a having a coating 16a comprising an alloy of aluminum and silicon. The weld surfaces 12a, 12b are arranged facing each other and spaced apart from each other. A laser beam 18 is guided along the first weld surface 12a and the second weld surface 12b in a wobbling motion to weld the weld surfaces 12a, 12b together. In particular, the laser beam is guided along the first weld surface 12a and the second weld surface 12b at the same time. The wobbling motion has a direction component in a feed direction FD of the laser beam 18 and a direction component perpendicular to the feed direction FD. The path 24 of the laser beam 18 on the weld surfaces 12a, 12b has a pattern that repeats with a period 30 in the feed direction FD. The width of the path 24 perpendicular to the feed direction FD is greater than the period 30 of the path 24 in the feed direction FD. The laser beam 18 is divided in a radial direction from its beam axis BA into an inner profile 20 and an outer profile 22 whose intensities differ, with the outer profile 22 surrounding the inner profile 20.

FIG. 4 shows a flowchart illustrating a method of welding two metal sheets according to some embodiments. The method includes, at 410, providing a first sheet having a first weld surface and a second sheet having a second weld surface. The first sheet has a coating comprising an alloy of aluminum and silicon on the first weld surface. The method further includes, at 420, irradiating the first weld surface and the second weld surface with a laser beam. The laser beam has an inner core and an outer ring with different intensity profiles. The laser beam is moved with a wobbling motion in a feed direction along an imaginary feed line and perpendicular to the imaginary feed line. A path of the laser beam along the imaginary feed line is of a periodic shape. A width of the path perpendicular to the imaginary feed line is greater than a length of a period of the path along the imaginary feed line. Additionally or optionally, the first sheet and the second sheet are joined by a fillet weld or by an I-weld. Additionally or optionally, the path of the laser beam is in a form of a sinusoidal function, a meander, or a zigzag function. Additionally or optionally, the path of the laser beam is in a form of successive eights or infinity symbols. Additionally or optionally, the imaginary feed line has a sinusoidal, circular, spiral, or zig-zag shape, or a C-shape.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "of" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10a-b sheets
12a-b weld surfaces
14 gap
16a-d coatings comprising alloy of aluminum and silicon
18 laser beam
20 inner core
22 outer ring
24 path of the laser beam
26 amplitude
28 feed line
30 period
32 predetermined section
34a-b segments
36 melting zone
FD feed direction
BA beam axis

The invention claimed is:

1. A method of welding two metal sheets, the method comprising:
providing a first sheet having a first weld surface and a second sheet having a second weld surface, the first sheet having a coating comprising an alloy of aluminum and silicon on the first weld surface; and
irradiating the first weld surface and the second weld surface with a laser beam, the laser beam having an inner core and an outer ring with different intensity profiles,
wherein the laser beam is moved with a wobbling motion in a feed direction along an imaginary feed line and perpendicular to the imaginary feed line, and
wherein a path of the laser beam along the imaginary feed line is of a periodic shape, a width of the path perpendicular to the imaginary feed line being greater than a length of a period of the path along the imaginary feed line.

2. The method according to claim 1, wherein the second weld surface is coated with the alloy of aluminum and silicon.

3. The method according to claim 1, wherein the wobbling motion has a same amplitude on both sides of the imaginary feed line, and wherein the amplitude is greater than the period of the path of the laser beam.

4. The method according to claim 1, wherein the first sheet and the second sheet are arranged as a lap joint.

5. The method according to claim 1, wherein the first sheet and the second sheet are joined by a fillet weld or by an I-weld.

6. The method according to claim 1, wherein the path of the laser beam is in a form of a sinusoidal function, a meander, or a zigzag function.

7. The method according to claim 1, wherein the path of the laser beam is in a form of successive eights or infinity symbols.

8. The method according to claim 1, wherein a power of the laser beam is varied along the path of the laser beam.

9. The method of claim 8, wherein the power of the laser beam is increased or decreased during a welding process in a predetermined section at an end of the path of the laser beam in the feed direction of the laser beam compared to an averaged power of the laser beam on the path of the laser beam.

10. The method according to claim 1, wherein the laser beam is guided multiple passes along a same segment of the imaginary feed line, and wherein an amplitude of the wobbling motion in a direction perpendicular to the imaginary feed line is set differently for each pass of the segment.

11. The method according to claim 1, wherein the first sheet and/or the second sheet comprises a steel that contains ferrite, martensite, bainite and/or austenite.

12. The method according to claim 11, wherein the steel is a multiphase steel.

13. The method according to claim 1, wherein the imaginary feed line has a sinusoidal, circular, spiral, or zig-zag shape, or a C-shape.

14. The method according to claim 1, wherein the first weld surface and the second weld surface are arranged such that the first weld surface and the second weld surface face each other, with a gap between the first weld surface and the second weld surface.

15. The method according to claim 14, wherein a width of the gap between the first weld surface and the second weld surface is in a range from 0.05 mm to 0.3 mm.

16. The method according to claim 15, wherein the width of the gap between the first weld surface and the second weld surface is in a range from 0.1 mm to 0.2 mm.

17. The method according to claim 1, wherein a proportion of the power of the inner core of the laser beam is in a range from 20% to 80% of a total power of the inner core and the outer ring of the laser beam.

18. The method according to claim 17, wherein the proportion of the power of the inner core of the laser beam is in a range from 59% to 61% of the total power.

19. The method according to claim 1, wherein a speed of the laser beam along the imaginary feed line during the wobbling motion is in a range from 2 m/min to 8 m/min.

20. The method according to claim 19, wherein the speed of the laser beam along the imaginary feed line during the wobbling motion is in a range from 3 m/min to 5 m/min.

* * * * *